US009094376B2

(12) United States Patent
Krishnaswamy et al.

(10) Patent No.: US 9,094,376 B2
(45) Date of Patent: *Jul. 28, 2015

(54) SYSTEM AND METHOD FOR FACILITATING COMMUNICATIONS BASED ON TRUSTED RELATIONSHIPS

(71) Applicant: Avaya Inc., Basking Ridge, NJ (US)

(72) Inventors: Venkatesh Krishnaswamy, Holmdel, NJ (US); Eunsoo Shim, Princeton Junction, NJ (US); John H. Yoakum, Cary, NC (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/147,816

(22) Filed: Jan. 6, 2014

(65) Prior Publication Data

US 2014/0122880 A1 May 1, 2014

Related U.S. Application Data

(63) Continuation of application No. 13/250,008, filed on Sep. 30, 2011, now Pat. No. 8,627,076.

(51) Int. Cl.
*H04L 9/32* (2006.01)
*H04L 29/06* (2006.01)

(52) U.S. Cl.
CPC ............ *H04L 63/0428* (2013.01); *H04L 63/08* (2013.01); *H04L 63/102* (2013.01); *H04L 63/126* (2013.01)

(58) Field of Classification Search
CPC ... H04L 63/061; H04L 63/04; H04L 63/0428; H04L 63/126; H04L 63/102; H04L 63/08
USPC ................................ 713/168; 380/283; 726/5
See application file for complete search history.

(56) References Cited

U.S. PATENT DOCUMENTS 6,968,050 B1 11/2005 Pershan et al.
7,591,013 B2 9/2009 Bhargava et al.
8,156,536 B2 * 4/2012 Polk ................................ 726/1
8,627,076 B2 * 1/2014 Krishnaswamy et al. .... 713/168

(Continued)

OTHER PUBLICATIONS

Saint-Andre, Peter, “XEP-0154: User Profile”, XMPP, Version 0.6, Apr. 18, 2008.

(Continued)

*Primary Examiner* — Matthew Smithers

(57) ABSTRACT

Disclosed herein are systems, methods, and non-transitory computer-readable storage media for facilitating communications based on a trusted relationships. A system configured to practice the method first receives a communication request from a second communication device for a specific resource, wherein the communication request is based, at least in part, on trust information generated by a previously established trusted relationship. The system confirms, via an access to a trust database and using the trust information, (1) an identity of a sender of the communication request and (2) access permissions for a requested resource. Then, if the identity and the access permissions are confirmed, the system establishes communications between the first communications device and the second communications device in response to the communication request according to the specific resource. The trust information can include a trust user ID and a trust key.

20 Claims, 6 Drawing Sheets

START

RECEIVING A COMMUNICATION REQUEST FROM A REMOTE COMMUNICATION DEVICE FOR A SPECIFIC RESOURCE, WHEREIN THE COMMUNICATION REQUEST IS BASED, AT LEAST IN PART, ON CREDENTIAL INFORMATION GENERATED BASED ON A PREVIOUSLY ESTABLISHED — 602

RETRIEVING DATA, FROM A TRUST DATABASE ASSOCIATED WITH THE PREVIOUSLY ESTABLISHED TRUSTED RELATIONSHIP, BASED ON THE CREDENTIAL INFORMATION — 604

IF THE DATA CORRESPONDS TO EXPECTED DATA FOR THE REMOTE COMMUNICATION DEVICE, ESTABLISHING COMMUNICATIONS WITH THE REMOTE COMMUNICATION DEVICE IN RESPONSE TO THE COMMUNICATION REQUEST ACCORDING TO THE SPECIFIC RESOURCE — 606

FINISH

(56) References Cited

U.S. PATENT DOCUMENTS

| | | | | |
|---|---|---|---|---|
| 2008/0301788 | A1 | 12/2008 | Yoakum | |
| 2009/0077616 | A1 | 3/2009 | Lindholm et al. | |
| 2009/0220080 | A1* | 9/2009 | Herne et al. | 380/255 |
| 2009/0293099 | A1 | 11/2009 | Yoakum | |
| 2010/0082977 | A1 | 4/2010 | Boyle et al. | |
| 2010/0306538 | A1* | 12/2010 | Thomas et al. | 713/168 |
| 2011/0093696 | A1* | 4/2011 | Grall | 713/153 |
| 2011/0235631 | A1 | 9/2011 | Krishnaswamy et al. | |
| 2012/0166802 | A1* | 6/2012 | Blom et al. | 713/171 |
| 2013/0101121 | A1* | 4/2013 | Nordholt et al. | 380/279 |

OTHER PUBLICATIONS

Theo et al., "XEP-0006: Profiles" XMPP, Version 1.1, May 8, 2002.

Hollenbeck, S., "Number Mapping for the Extensible Provisioning Protocol", Network Working Group, VeriSign, Inc., Dec. 1, 2004.

Rosenberg et al., "The Public Switched Telephone Network (PSTN) Validation Protocol (PVP)", dispatch, Cisco, Nov. 9, 2009.

Rosenberg et al., "Verification Involving PSTN Reachability: Requirements and Architerture Overview", dispatch, Cisco, Nov. 9, 2009.

* cited by examiner

100
STORAGE DEVICE
MOD 1
MOD 2
MOD 3
160
162
164
166
BUS
110
RAM
150
ROM
140
MEMORY
130
PROCESSOR
120
CACHE
122
INPUT DEVICE
190
OUTPUT DEVICE
170
COMMUNICATION INTERFACE
180

330
ALICE
370
a.com
FEDERATION
SERVER
MAPPING
TABLE
350
310
a.com
TELEPHONE
SWITCH
INTERNET
PSTN
BASIC SYSTEM ARCHITECTURE
320
b.com
TELEPHONE
SWITCH
380
b.com
FEDERATION
SERVER
MAPPING
TABLE
360
340
BOB

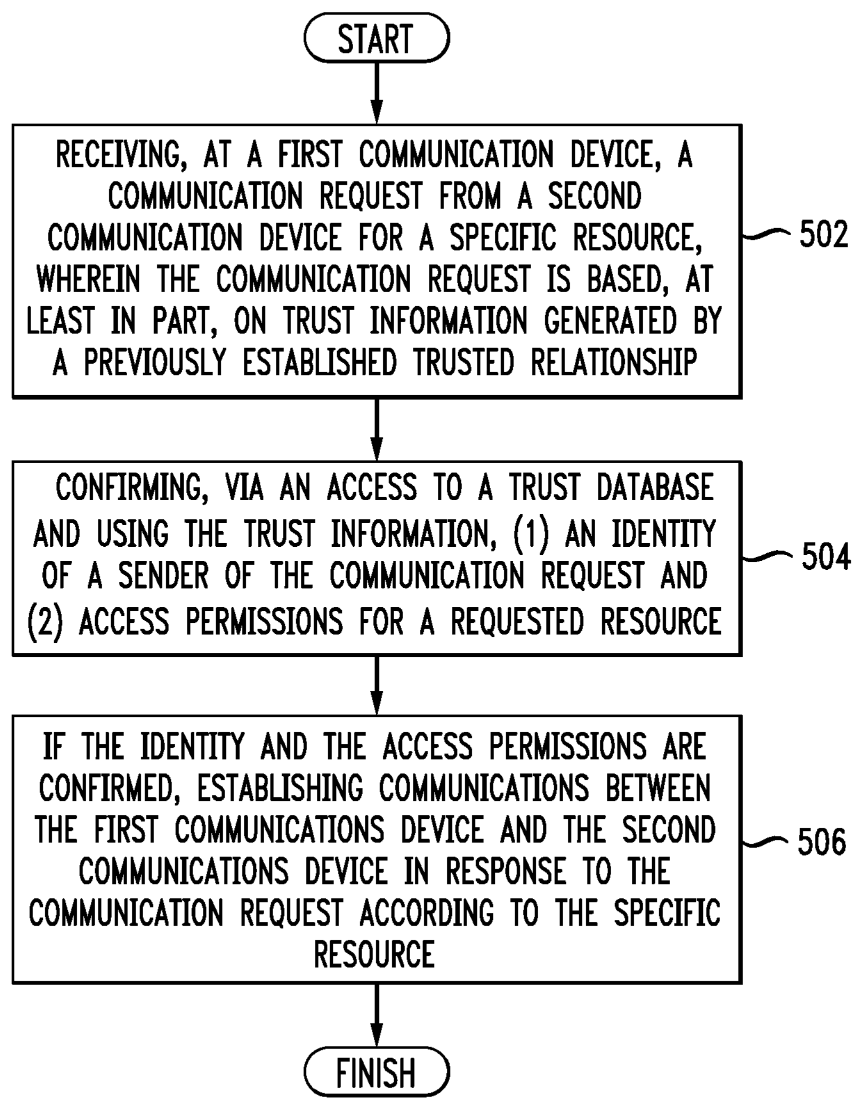
FIG. 5
START
RECEIVING, AT A FIRST COMMUNICATION DEVICE, A COMMUNICATION REQUEST FROM A SECOND COMMUNICATION DEVICE FOR A SPECIFIC RESOURCE, WHEREIN THE COMMUNICATION REQUEST IS BASED, AT LEAST IN PART, ON TRUST INFORMATION GENERATED BY A PREVIOUSLY ESTABLISHED TRUSTED RELATIONSHIP
502
CONFIRMING, VIA AN ACCESS TO A TRUST DATABASE AND USING THE TRUST INFORMATION, (1) AN IDENTITY OF A SENDER OF THE COMMUNICATION REQUEST AND (2) ACCESS PERMISSIONS FOR A REQUESTED RESOURCE
504
IF THE IDENTITY AND THE ACCESS PERMISSIONS ARE CONFIRMED, ESTABLISHING COMMUNICATIONS BETWEEN THE FIRST COMMUNICATIONS DEVICE AND THE SECOND COMMUNICATIONS DEVICE IN RESPONSE TO THE COMMUNICATION REQUEST ACCORDING TO THE SPECIFIC RESOURCE
506
FINISH

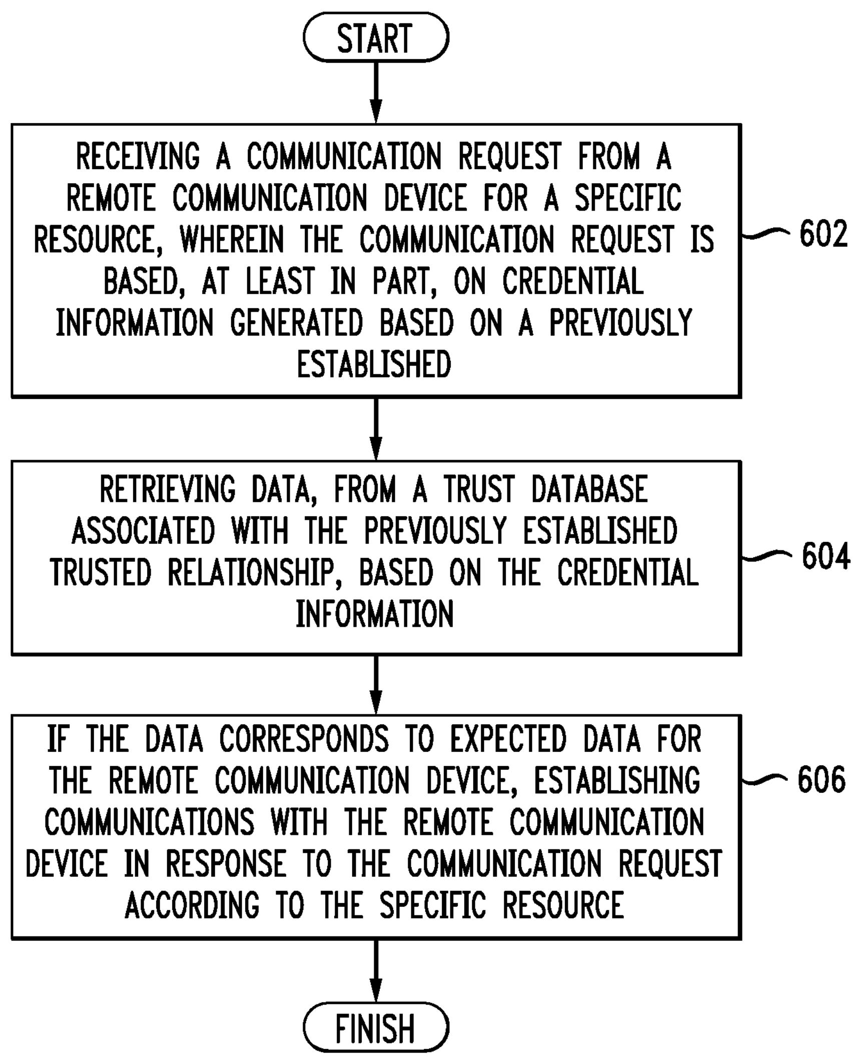
FIG. 6
START
RECEIVING A COMMUNICATION REQUEST FROM A REMOTE COMMUNICATION DEVICE FOR A SPECIFIC RESOURCE, WHEREIN THE COMMUNICATION REQUEST IS BASED, AT LEAST IN PART, ON CREDENTIAL INFORMATION GENERATED BASED ON A PREVIOUSLY ESTABLISHED
602
RETRIEVING DATA, FROM A TRUST DATABASE ASSOCIATED WITH THE PREVIOUSLY ESTABLISHED TRUSTED RELATIONSHIP, BASED ON THE CREDENTIAL INFORMATION
604
IF THE DATA CORRESPONDS TO EXPECTED DATA FOR THE REMOTE COMMUNICATION DEVICE, ESTABLISHING COMMUNICATIONS WITH THE REMOTE COMMUNICATION DEVICE IN RESPONSE TO THE COMMUNICATION REQUEST ACCORDING TO THE SPECIFIC RESOURCE
606
FINISH

SYSTEM AND METHOD FOR FACILITATING COMMUNICATIONS BASED ON TRUSTED RELATIONSHIPS

PRIORITY INFORMATION

The present application is a continuation of U.S. patent application Ser. No. 13/250,008, filed Sep. 30, 2011, the content of which is incorporated herein by reference in its entirety.

BACKGROUND

1. Technical Field

The present disclosure relates to communication and more specifically to facilitating communications based on trust information generated based on a previously established trusted relationship.

2. Introduction

Traditionally, the public switched telephone network (PSTN) was utilized for inter-organization communication in the form of two-way calling or conference calling with more than one participant. However, evolving technology such as Voice over IP (VoIP) allows users to communicate over the Internet using a richer feature set than the features provided by the traditional PSTN. A VoIP system enables voice communication over an IP-based network, such as the Internet, and includes advanced features such as video over IP, telephony presence, and multi-modal communications. These advanced features can be used internally in each organization, but due to organization security restrictions they are not generally available for inter-organization communications across organizational boundaries. Telephone numbers are universal and can be used on voice over IP (VoIP) systems as well as on traditional telephony systems. Telephone numbers are distributed as the address of VoIP devices that are interconnected to the public switched telephone network (PSTN).

One key technical problem to realize large-scale inter-organization is providing trusted and secure communications without falling prey to malicious or unwanted communications. If an attacker provides a false SIP address, the calls to the phone number are sent to the false SIP address, exposing the call to the attacker for eavesdropping or hijacking. It is critical to ensure the provided SIP address is correct for the target phone number. The infrastructure for collaboration between organizations should prevent attackers from acquiring the SIP addresses and making unrestricted VoIP calls to the SIP addresses. Another concern is the security of communications. Existing communication security solutions are cumbersome and/or rely on some kind of third-party verification service.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for facilitating communications based on trust information. The trust information can be generated using any of a number of steps, including but not limited to a challenge/response interaction. The trust information can include, for each user in the trust relationship, a trust user ID and a trust key. In one example, output of the trust relationship establishment between Alice at A.com and Bob at B.com can include, a trust user ID for Bob, a trust key for Bob, a different trust user ID for Alice, and a trust key for Alice.

In a simple illustrative example, Alice and Bob, who are in different domains (such as companies, schools, or other organizations), first establish a trust relationship. As part of the trust relationship, Alice and Bob establish trust information stored somewhere within their respective domains, such as on a handset, a desktop computer, server, or SIP proxy machine. The trust information of one user includes a trust user ID and a trust key for the other user. The trust user ID can be a username, SIP address, phone number, or other identifying data. The trust key can be a cryptographic key or other data by which the trusted relationship is confirmed.

After the trusted relationship is established, Alice can pick up her phone, for example, and dial Bob's SIP number. Alice's SIP proxy picks up that request, fetches information for that request, and can convert the request to a resource access request to Bob's SIP proxy. The resource access request can include a resource type (such as SIP), and local user (meaning Alice) attributes such as Alice's ID, Alice's phone number, Alice's SIP address, and Alice's SIP proxy address. The resource access request can also include an ID of the remote user being dialed (i.e. Bob). The resource access request can further indicate requested resource features, such as a voice call, a video call, presence information, contact data, a shared file, and so forth.

Bob's SIP proxy receives the resource access request, and, based on its local trust database information, generates a resource access reply. The resource access reply can include an approved resource type (such as SIP), and local user (meaning Bob) attributes such as Bob's ID, Bob's phone number, Bob's SIP address, and Bob's SIP proxy address. The resource access reply can also include remote user (meaning Alice) attributes such as Alice's ID and access key, which can include a certificate. Further, the resource access reply indicates allowed resource features. For example, Alice's resource access request may have requested voice and video, but Bob's resource access reply may only permit voice. The permissions and decisions regarding what resource features are permitted can be based on user preferences, available resource features, availability data, relationship preferences, time of day, scheduling data, and so forth. In one example, Bob's SIP proxy server can automatically allow voice, but then prompt Bob regarding additional resource features being requested.

Then, both Alice's SIP proxy and Bob's SIP proxy can configure their own respective networks to facilitate communications by allowing Alice's phone call to Bob to go through. For example, the SIP routing table can be modified to include updated origination data, dial pattern data, and next hop data for the call. The origination data in this example would be Alice's phone number; the dial pattern data in this example is Bob's phone number; and the next hop data for this example would be Bob's SIP proxy server's address.

When handling resource requests for different types of resources, either side can generate a new key for each resource based on its type. For example, the SIP proxy can generate a new session key for a SIP session, and can generate the certificates required by TLS for a TLS-based session. If the resource request is for secure, encrypted video chat via a service that requires a special token, the SIP proxy can generate and manage that special token automatically. Thus, the system can use the trust user ID and the trust key to establish resource-specific requirements to facilitate the communication. Thus, the trust database can be used as a consistent way to handle resource requests for different resource types using a single set of credentials.

In an exemplary system for facilitating communications, the system, which can be a first communications device, identifies a second communication device and trust information, such as a trust user ID and a trust key, associated with the first communication device and the second communication device. The trust information trust information can be generated, for example, from an exchange of a challenge query and a response based on a communication context between a first user and a second user, and each of the first communication device and the second communication device has a copy of at least part of the trust information. The trust information can be generated various other ways that do not involve a challenge query or response, for instance. The exchange can occur as part of a previous separate communication. If the exchange of the challenge query and the response is successful, a trusted relationship between the first user and the second user can be established and the trust information can be generated by one or both user.

The system generates a communication request, wherein at least a portion of the communication request is encrypted using the trust information. The communication request can be a session initiation protocol (SIP) request. The headers or other portions of the session initiation protocol request can remain unencrypted and payload of session initiation protocol request can be encrypted. The system transmits the communication request to the second communication device. The system can optionally, upon receiving an acknowledgement of the communication request, establish secure communications between the first communication device and the second communication device based on the trust information. The system can establish the secure communications by encrypting streamed voice communications based on user information such as a phone number, a session initiation protocol address and/or a credential. The second communication device can generate the acknowledgement by looking up, based on an identity associated with the first communication device, the trust information in a database of identities and trust information.

In an exemplary system for receiving a request to initiate secure communications, the system receives an encrypted communication request from a first device. The system retrieves from a database storing identities and trust information, based on an identity associated with the first device, trust information associated with the first device. The trust information can be generated from an exchange of a challenge query and a response based on a communication context between a first user associated with the first device and a second user associated with a second device, and wherein each of the first communication device and the second communication device has a copy of the trust information. The database can store trusted relationships between users established by successful exchanges of challenge queries and responses.

The system applies a decryption algorithm to the encrypted communication request using the trust information to yield a decrypted communication request and establishes secure communications with the first device via the communications interface based on the decrypted communication request and the trust information. The secure communications can include encrypted streamed voice communications based on user information including at least one of a phone number, a session initiation protocol address and a credential.

The approaches set forth herein provide a new way of generating or identifying the trust information based on the trusted relationship, and using the trust information in a SIP invite to make sure that the identity of the other user is authentic and secure the communications at the same time.

If one server sends an encrypted message, and the other server can decrypt it, then the identity of one and/or the other is implicitly authenticated. This works so long as the trust information, such as the trust user ID and/or the trust key, is kept secure and is not leaked out or compromised. This approach can operate using unmodified or modified SIP messages. Alternatively, this approach can operate on the server side by altering how SIP messages are processed. SIP payload can be encrypted, while leaving SIP non-payload portions unencrypted.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5 illustrates an exemplary method embodiment for initiating secure communications; and FIG. 6 illustrates an exemplary method embodiment for receiving a request to initiate secure communications.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

A system, method and non-transitory computer-readable media are disclosed for facilitating communications based on trusted relationships across domain boundaries. A brief introductory description of a basic general purpose system or computing device in FIG. 1 which can be employed to practice the concepts is disclosed herein. The devices and systems set forth herein can be computer servers, desktop computers, routers, telecommunications devices, handsets, set-top boxes, smartphones, tablet computing devices, and/or any other communications device, and can include software and hardware components.

The approaches disclosed herein take advantage of organization-specific relationships and/or mapping databases in order to establish secure communications between users in different security domains and/or across organizational or other security boundaries based on a previously established trusted relationship between two users. The trusted relationship can involve users such as any one or more of an individual, a device, a phone number, a SIP URI, a group of individuals, an organization, and so forth. Each organization of a first user can include a local database storing information which can be used in order to establish secure communications with a second user at a second organization. The information in the first organization's database corresponds to information in the second organization's database. These variations shall be discussed herein as the various embodiments are set forth. The disclosure now turns to FIG. 1.

Figure 1:
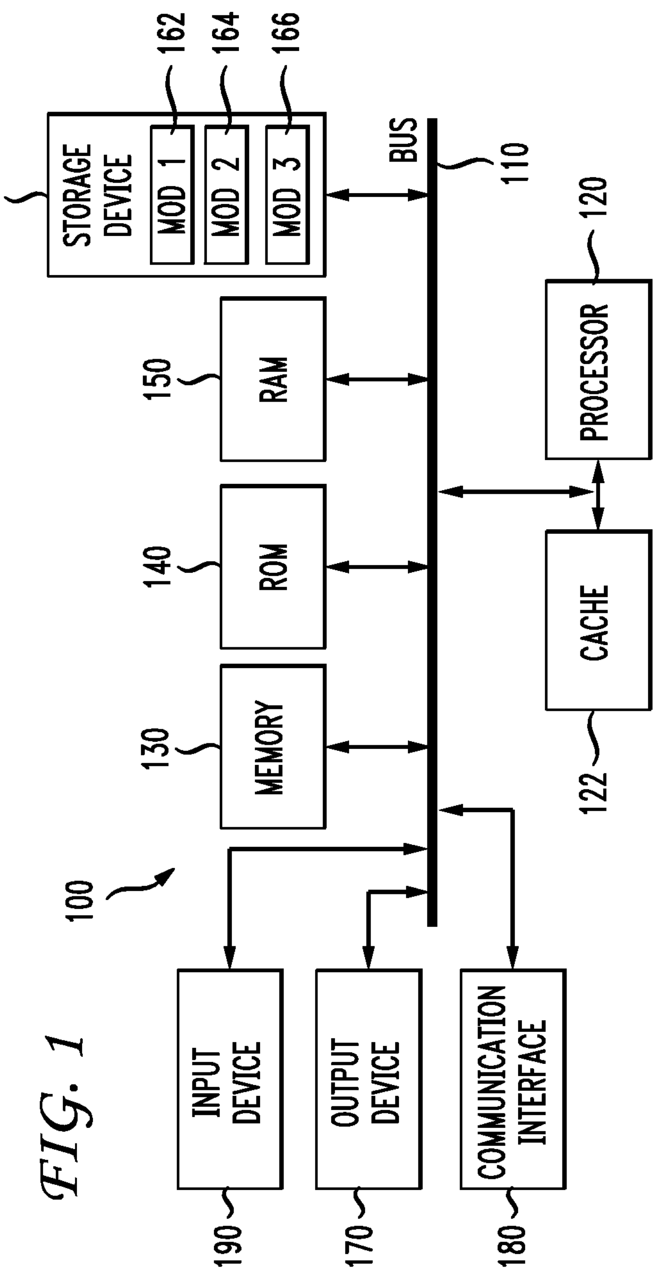
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Computer-readable storage media and devices expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory

130 at runtime or may be stored as would be known in the art in other computer-readable memory locations.

Figure 2:
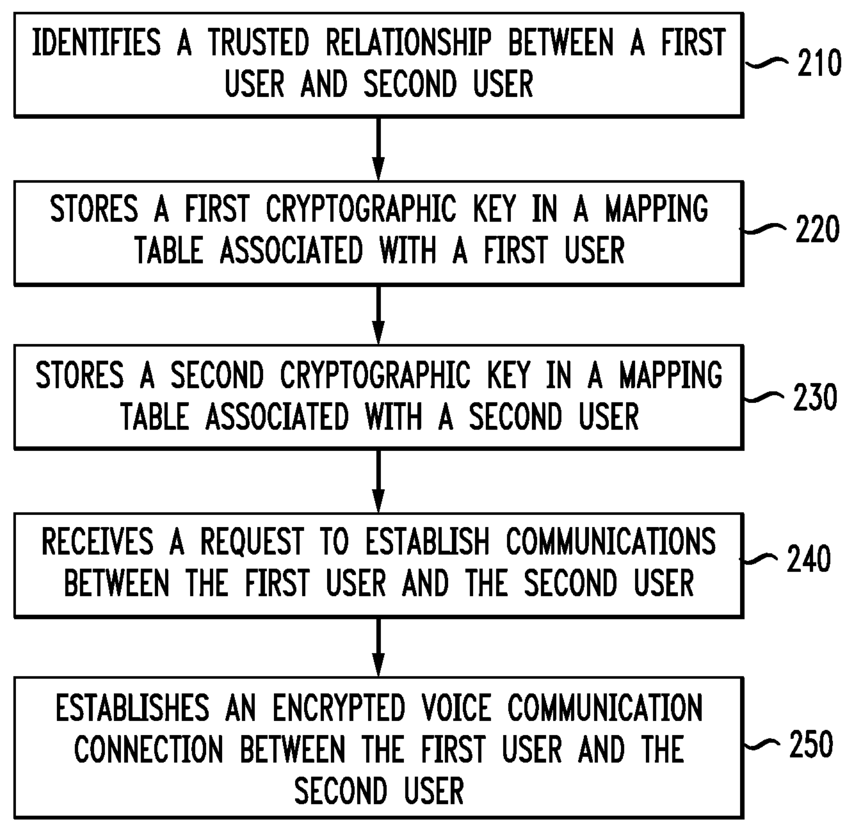
FIG. 2 illustrates an example of two devices configured to automatically establish a relationship based on a prior association.

Having discussed some exemplary computing device components, the disclosure returns to a discussion of secure communications. FIG. 2 illustrates an exemplary architecture for establishing a trusted relationship between two or more users. FIG. 2 is provided for illustration of one possible way to establish trusted relationships, and does not limit the disclosure. The end result of a trusted relationship, as represented by a set of trust user IDs and trust keys, can be established in other ways. For example, the trusted relationship can be manually initiated, automatically generated based on previous interactions that were not primarily for trust relationship establishment purposes, etc. The details of FIG. 2 will be discussed below. The trusted relationship established as shown in FIG. 2 and information which is a result thereof can serve as a trust information for the purposes set forth herein, such as allowing users to identify each other, enabling different forms of communications related encryption, establishing secure voice, video, and/or other streaming communications between two users without relying on a third-party certificate authority or other equivalent third-party actor.

When the users establish the relationship, the servers on each side generate a key, token, or other trust information to hand to the other to store along with the relationship. Then, one server can incorporate or otherwise use the key, token, or trust information when sending a SIP invite to the other server to initiate a new session at a later time. For example, the server can include the key, token, or trust information as part of the SIP invite, but that risks exposure and leaking of the trust information to packet sniffing. In another variation, the server can encrypt all or part of the SIP invite using the trust information. In this manner, the trust information is not transmitted through the network, and the receiving server can use its own copy of the trust information or corresponding secret to decrypt the SIP invite. For example, the receiving server can examine a SIP header to determine a source of an incoming request, fetch a trust information from a table that maps addresses or identities to trust information, and decrypt the message using the trust information. If the decrypted data is nonsense, the receiving server can ignore or discard the request, but if the decrypted data matches an expected structure, the receiving server can assume that the identity is correct and that the identity is trusted, and respond to the request accordingly.

This approach can guarantee that the person or server sending the SIP invite is authentic and trusted. This allows the server to use a trust information established in the process of building the trust and tables. Thus, then one server sends a SIP or other invite to another server for a shared session, the server sends the trust information, instructions on how to generate the trust information based on the commonly available information, and/or a message encrypted using the all or part of a trust information. The trust information can be part of a symmetric or asymmetric encryption scheme.

The servers can then use the trust information not only to authenticate the identity of one another, but can also use the trust information to encrypt signals sent between one another, such as voice and video streams. As a byproduct of the process of establishing the trust, each server stores information on each end, examples of which are set forth in the description of FIG. 2, below. For example, FIG. 2 illustrates a question prompting and response interaction to establish a trusted relationship between two individuals or servers. As the entities build the relationship, each stores information that can be used to establish secure connections. This stored information can provide for encrypted or otherwise secure communications without relying on a third-party certificate to vouch for other side's identity. Each side has sufficient stored information to use encrypted signaling and know for sure the identity of the other user without going through the establishing process again.

The trust information can be used to encrypt signals, such as video streams, but can alternatively be used to encrypt non-streaming media, such as attachments in an email. Thus, this approach can serve as an alternative to transport layer security (TLS) to encrypting signaling. However, this approach does not rely on a certificate authority, as TLS does. The structure and interactions of FIG. 2 are illustrative examples of how to establish the trusted relationship, and other approaches can be substituted.

The disclosure turns now to FIG. 2, which illustrates an example of two systems each configured to automatically establish a relationship based on a prior association working together 200. Here a first user 202 wishes to establish a relationship with another user 204. This second user 204, however, belongs to another organization, and one or more security or privacy restriction limits the amount, type, and availability of information relating to communications across this organizational boundary. The first user 202 then communicates the desire to form a relationship with a server 206 which belongs to the first user's organization. The server 206 then searches through the communication logs 210 for instances of contact or references to the second user 204. If no such communications exist, then the server 206 can reply to the first user 202 that such a relationship requires contact, or the server 206 may initiate such contact. In most instances some communication history common to both users 202, 204 will exist. The first server 206 then creates a challenge query 214 and transmits this query to another server 208 belonging to the other organization of the other user 204. The challenge query 214 can be based on the common communication history, other sources common to both users, and/or information which should be known to the second user 204. Examples of other information which should be known to the second user 204 include the second user's birthday or the name of the second user's boss. The first server 206 can discover the other server 208 based on the communication history, by looking the server 208 up in a directory of organization communication servers, or by any other server discovery approach. This server 208 receives the query 214 and formulates an answer to the query based on its own communication logs 212. If the answer is not found in the communication logs, the server 208 can prompt the second user 204 for an answer to the query 214. The server 208 can prompt the second user 204 via an on-screen popup, an automated voice interface, text message, and/or other ways of communicating with the second user 204. The server 208 can determine how to contact the second user 204 based on presence information of the second user 204 and/or based on a relationship importance level between the first user and the second user.

The second server 208 then transmits the answer as a response 216 back to the first server 206. The response 216 can include or exclude the query, and can be either unencrypted or encrypted. When the response does not include the query, the response can resemble random information, presenting a difficult challenge to interpret for attackers. If encrypted, the response 216 can be encrypted using the query or the response as a base, key, or password to unlock the encryption, or can use a key common to both users. The sensitivity of the information being transmitted, as well as the trust levels being granted, are factors for determining if the system 100 encrypts the response. The first server 206 receives the response 216 and determines if the response 216 is sufficient to establish a trusted relationship. If not, then the process of creating queries 214 and receiving responses 216 can continue until the system 100 has sufficient information to determine if a relationship exists. In some instances, this determination is based on the number of attempts to derive a correct response, whereas in other instances this determination can be based on the proximity of a response to the expected response.

Upon receiving a response 216 meeting expectations, the server 206 creates a trusted relationship between the first user 202 and the second user 204. Creating a trusted relationship can include recording the relationship in a trusted relationship database 220 as well as sending confirmation 218 to the other server 208 that a trusted relationship has been approved. The confirmation 218 sent to the other server 208 can be a secret key or token, granting access to first user's 202 information, server, or data. The confirmation can be a text or binary based message indicating that establishment of the relationship or the rejection of the request to establish a relationship. The second server 208, upon receiving this confirmation 218, similarly stores the trusted relationship in a unique trusted relationship database 222 belonging to the second organization. In the trusted relationship databases 220, 222, information stored can include the individuals in the trusted relationship, the level of trust and access given to the individuals, as well as the basis for establishing the relationship.

The trusted relationship database can be contained wholly within a single organization or can be distributed across two or more organizations. A third-party can store and provide access to the trusted relationship database. In some variations, the database is not embodied as a separate store of data but rather is embodied as a set of rules or configurations governing how communication infrastructure of two organizations are allowed to communicate one with another to facilitate user to user contact. Each organization can utilize a single set of server and storage resources or a distributed set of servers cooperate to perform communication and data storage services necessary for each organization.

The trusted relationship established before the encrypted voice communication occurs can be based on a prior association between the users. Servers such as a corporate communications server or a user's personal computer can establish all or part of the trusted relationship. A trusted relationship based on user knowledge provides diverse levels of security depending on user knowledge. For example, an attacker may be able to easily discover or guess a zip code or address, whereas the last four digits of a social security number may be more difficult to extract. User knowledge based on dynamic information can provide stronger security than user knowledge based on static information.

The prior association that the trusted relationship is based on between the users in different security domains can be a phone call, electronic message exchange such as instant messaging, SMS or email, an in-person meeting or any other prior association. The system 100 can require that the prior association meets a specific threshold, such as the number of associations, or duration of time spent with the user, for instance. The trusted relationship can be based on a communication history such as message subject, message times and call times. The system 100 can establish a trusted relationship based on a challenge-response interchange between the users, such that a first server of the first user poses questions to the second server of the second user, to which the second user provides a response. For example, the first server can pose questions based on a prior event shared by the first and second users, such as attending a meeting or conference call together. The first server can ask questions relating to the meeting such as "What time did the meeting we attended together start?" or "What were the first two topics discussed in the meeting?" Similarly, the first server can ask questions related to the nature of the users association such as "At which conference did the first user and the second user initially meet?" or "Through which mutual colleague did the first user and the second user meet?" For strong security, the system 100 does not send the answers to the questions over the wire, but can instead send cryptographic hashes of the answers over the wire. The server posing the questions can compare the received hash of the answer with a stored hash of the correct answer. If the hashes match, the server considers the answer correct. Additionally, servers can store different sets of questions depending on their trust requirements or preferences to ask another server when establishing a trusted relationship.

Figure 3:
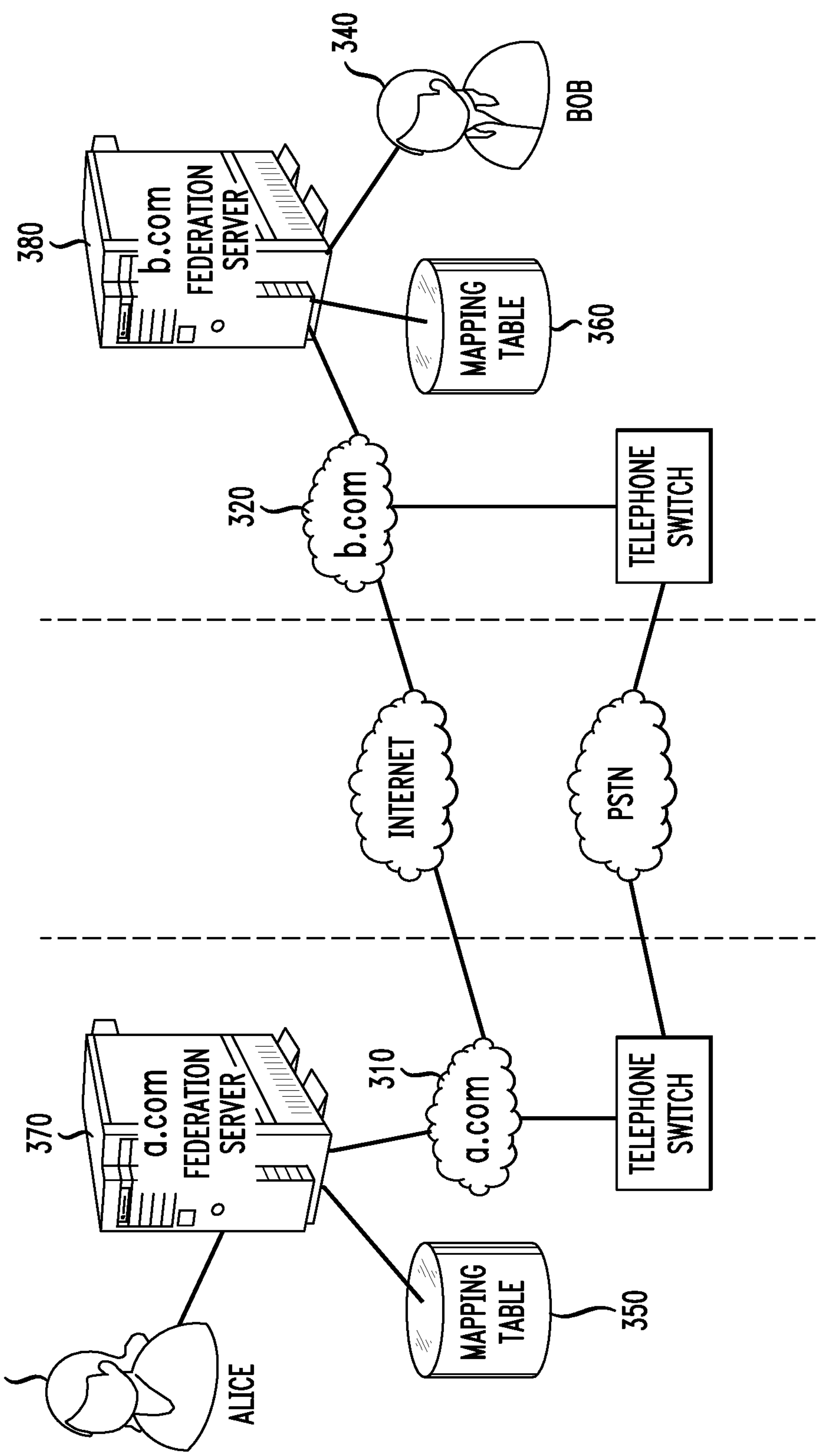
FIG. 3 illustrates an example basic system architecture.

FIG. 3 illustrates an exemplary system architecture. In this example, domain a.com serves Alice 330 and domain b.com serves Bob 340. Each domain has its own mapping table 350, 360 and proxy server 370, 380. Each domain can also store a local copy of cryptographic keys or trust information used to establish secure communications. The cryptographic keys can be stored in mapping tables 350, 360 so that the cryptographic keys can be looked up by an associated identity. For example, if a particular secure communication protocol requires a pair of keys to establish a connection, a.com can store one of the pair of keys associated with Alice 330, and b.com can store one of the pair of keys associated with Bob 340. Then, when Alice 330 wishes to communicate securely with Bob 340, their respective systems can provide the cryptographic keys and/or other credentials necessary to establish the connection, rather than going through some kind of third-party server that stores keys. The pair of "keys" can be two separately stored components that, when combined, form a single key. Alternatively, the pair of keys can be complementary such that one key can decrypt a communications stream generated using the other key, for example as utilized in public key encryption. The keys can be stored in a central organizational location or can be stored locally on a computing device of the respective user.

The domains are connected to each other via the Internet or other communications network. The mapping tables store mapping information for trusted users such as phone number, SIP address, and/or credentials or other information related to secure communications such as a certificate or encryption key. A server can integrate single sign on between domains such that a user signs on once and has access to multiple security domains. For example, Alice wishes to access systems and applications outside of her domain a.com 310 in Bob's domain b.com 320. Alice logs into her computer as usual and navigates to Bob's domain to research widgets at http://widgets.b.com and does not need to enter a password because her credentials are passed to b.com using the servers 370, 380.

Once the system 100 establishes a trusted relationship, the first user stores a cryptographic key associated with a first user and the second user in a mapping table in the first domain. The cryptographic key corresponds to a second cryptographic key stored in a mapping table in the second security domain associated with the second user. For example, Alice and Bob have established a trusted relationship based on a prior association through email. Both Alice and Bob store corresponding cryptographic keys generated by a server in mapping tables in their own security domains. The cryptographic keys can be the same for use in symmetric key encryption, or complementary for use in asymmetric encryption. A server can generate a cryptographic key valid for a predetermined time period and send the key to another user.

Alice stores a cryptographic key for Bob generated by Bob's proxy server 380 in the mapping table 350 in her domain a.com and Bob stores a cryptographic key for Alice generated by Alice's proxy server 370 in the mapping table 360 in his domain b.com. In addition to the cryptographic keys, the mapping tables can store phone numbers, SIP addresses and any other pertinent information. The cryptographic keys can be generated by an issuing authority and stored locally with the mapping tables in the respective organizations. In another variation, the two servers can negotiate and establish the cryptographic keys without reaching out to a third-party entity. In one aspect, each server does not have access to or knowledge of the other server's key, but bi-directional communications can be established using the keys because each is able to decrypt information, generated with a remote key, from the remote server using the locally available key.

The security and available uses of the cryptographic keys can depend on a level of security of the trust establishment procedure. The phone number mapping could be incorrect because of a mistake at the remote domain because the remote domain's administrator did not maintain the information up-to-date. This risk is minimal because the mapping information is used only between two users who trust each other. Trust between the users can be established for a specific lifetime and may be reconfirmed by the user or reestablished automatically before expiration. If the trust between the users is broken for whatever reason, the server can disable the cryptographic key and/or any subset of functionality enabled by the cryptographic key. The users no longer are able to establish a secure communication session without valid cryptographic keys.

After the system 100 identifies a trusted relationship between two users and stores cryptographic keys, SIP addresses and phone numbers in mapping tables in separate domains, the system 100 receives a request to establish a communication session between the first user and the second user. The system establishes SIP peering via a call agent, such that an incoming communication session is authenticated and authorized. The call agent utilizes the servers in this task. The servers retrieve the SIP addresses and the cryptographic keys from the mapping table, and SIP establishes an encrypted voice communication connection between the users. Alternately, the system 100 establishes an encrypted multimedia communication connection between the users, allowing the users to communicate using voice, video, text messaging or other formats and transmit such information as presence information.

Under this approach, no central server is needed to store mapping information and cryptographic keys for a large number of phone numbers and no centralized authority is needed to authenticate user identities. The user's phone number and SIP address may be retrieved from a corporate directory or similar source and stored in the mapping table. The advantages of the disclosed method make a simpler and scalable system for establishing secure communication sessions between users.

In one illustrative example, Alice calls Bob by dialing Bob's phone number without specifying a specific SIP address or even that the dialed number corresponds to a SIP address. Alice's client device generates an original message and sends that message to Alice's SIP proxy (i.e. her local proxy). The message initially contains the destination address according to the format for a normal internal call handled by Alice's SIP proxy. Then a process running on Alice's SIP proxy hijacks or intercepts the request, which identifies that the request is addressed to Bob, a remote user outside of the Alice's SIP proxy's control, and that Bob has a previously established trusted relationship with Alice. Then Alice's SIP proxy identifies Bob and verifies that the call is a Voice over IP (VoIP) call, which the trusted relationship indicates is permitted in this relationship. Then, Alice's SIP proxy translates the invite into an address at Bob's domain, B.com. Alice's SIP proxy selects the appropriate key from the database for Bob. This mapping occurs internally at Alice's SIP proxy. Alice's SIP proxy then follows the resource-specific mechanism for connecting the VoIP connection via SIP. Alice's SIP proxy can handle multiple different types of resource-specific mechanisms for different resource types. In some cases, the resource-specific mechanisms can be influenced by the type and capabilities of equipment on Bob's side.

Alice's SIP proxy presents a certificate and exchanges a session key with B's SIP proxy, which were created and previously provided by B's SIP proxy. Then B's SIP proxy verifies the key and, from the key, identifies Alice as the remote user and Bob as the target local user, using a trusted information database. From the key, B's SIP proxy can map the local user, Bob, and remote user, Alice. Then B's SIP proxy can verify a trusted relationship, based on the key, between Bob and Alice. Once the key is confirmed, B's SIP proxy and A's SIP proxy exchange a SIP session key, enabling Alice's SIP proxy to send a SIP invite message (which doesn't contain key, but contains Alice's SIP address and Bob's SIP address). Because this relies on the trust establishment, Alice's SIP proxy and Bob's SIP proxy know that Alice and Bob are the right users, and can verify which resources are requested by the relationship and forward the request to B's client device.

This approach enables a per-user trust to be established, which is more fine-grained than a per-domain trust. For example, Bob's SIP proxy could blindly trust all communications from Alice's SIP proxy, but that could enable communications between individuals that were not intended or may not be permitted. This approach provides a way to establish trust on a person-to-person basis while retaining security and privacy. The trust information in the trust database can serve as a certificate on a per user basis.

Figure 4:
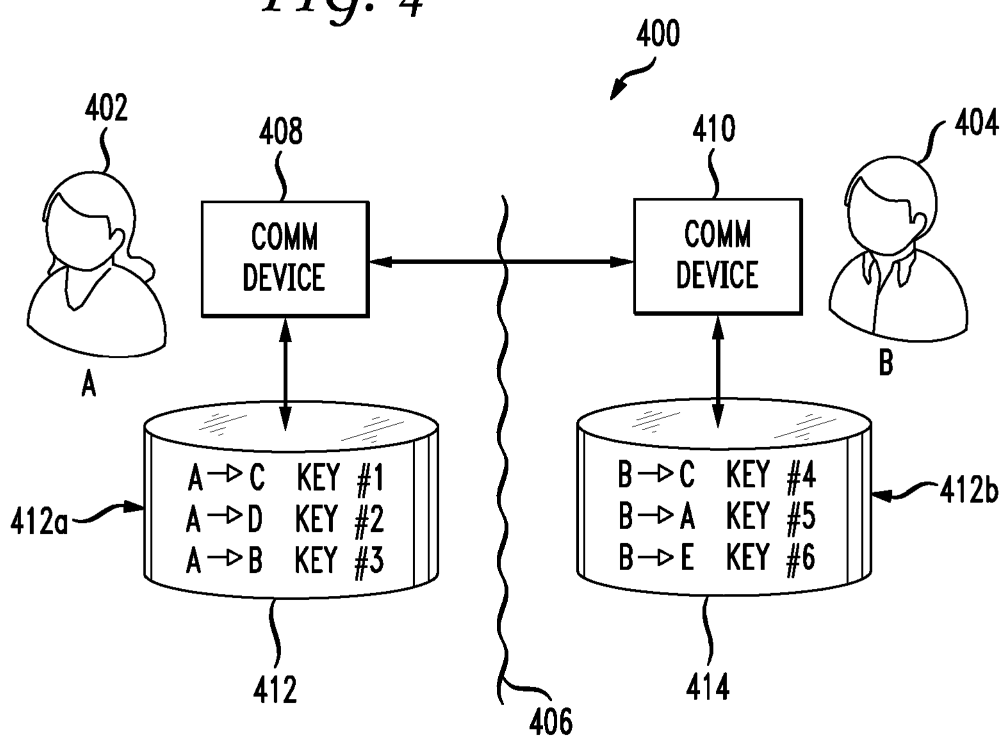
FIG. 4 illustrates two sides of an example system for establishing secure communications across an organizational boundary using locally stored mapping tables.

FIG. 4 illustrates two sides of an example architecture 400 for establishing secure communications across an organizational boundary using locally stored mapping tables for mapping trust information, such as trust user IDs and/or trust keys, to one or more specific trusted relationship. In this scenario, Alice 402 and Bob 404 have already established a trusted relationship with each other, optionally spanning at least one organizational boundary 406. The trusted relationship is at least partially manifested by entries in one or more local relationship databases 412, 414. In this example, a communication device 408 associated with Alice 402 can connect to a database 412 local to the first organization that indicates trusted relationships of users within the first organization with users external to the first organization. Similarly, a communication device 410 associated with Bob 404 can connect to its respective database 414 of similar relationships. The devices can connect directly or indirectly to their respective databases, for example through a server. The communication devices can be desktop phones, smartphones, and/or computing devices operating as part of a communications infrastructure for the organization.

These databases 412, 414 can include individual entries 412*a*, 412*b* describing at least some portion of a trusted relationship. The databases 412, 414 can optionally describe the entire trusted relationship. The entries 412*a*, 412*b* describe at least one user internal to the organization and at least one user external to the organization. The entries can describe multiple users within an organization and their relationship to multiple users in a same external organization, and/or can describe multiple users and their relationship to multiple users in different external organizations. The entries 412*a*, 412*b* can include a mapping to a specific SIP URI, such as a SIP gateway or a directly accessible client SIP address.

The databases 412, 414 can also include a cryptographic key for automatically establishing secure connections with users outside of the organization. For instance, if Alice 402 wants to communicate with Bob 404, communication device 408 can fetch the cryptographic key stored in database 412 corresponding to the entry 412*a* for Alice to user B. The communication device establishes a connection with the address stored in the database for Bob using the cryptographic key. The system can use the cryptographic key to establish the communication session, encrypt the entire communication session or exchange session cryptographic keys that encrypt the entire communication session and are valid only for the duration of the communication session. The two databases 412, 414 can store identical copies of a same key, cryptographic keys which complement each other, two portions of a single key that are only useful when combined, cryptographic keys which can be used to decrypt information encrypted using the complementary key, and/or different keys that can decrypt information encrypted according to a third, pre-shared encryption key. These and various other encryption schemes can be applied to one or both of the respective local cryptographic keys. The cryptographic keys can be on a per-relationship basis, a per-user basis, and/or a per-organization basis. A trusted relationship can include multiple cryptographic keys for different types of communications, different security situations, different users, and so forth.

In one example, communication device 408 encrypts outgoing communication data with a first cryptographic key associated with the trusted relationship, and decrypts incoming communication data with a second cryptographic key associated with the trusted relationship. The corresponding communication device 410 on the other side of the organization boundary 406 performs a similar function.

While the examples set forth herein use SIP to illustrate the principles disclosed, other communication protocols and resources can be used. For example, similar approaches can be used for non-SIP-based video conferencing, instant messaging, or other communications. In an instant messaging approach, instant messaging servers could replace or perform similar functions to Alice's SIP proxy and Bob's SIP proxy, allowing instant messaging to bridge domains and potentially even bridge instant messaging platform types.

In the requests, the system can provide the destination in clear text and encrypt the remaining information. The recipient's device or recipient's proxy can look up which key to use to decrypt the message based on the origination address. If the decrypted message is garbage or unintelligible, then the recipient's device or the recipient's proxy can ignore the request because it was not sent from an authorized sender. If the decrypted message contains useful and readable information, then the recipient's device or the recipient's proxy can determine implicitly that the sender is the right sender or at least has access to the correct encryption key. Thus, the proxies can transmit Alice's or Bob's IDs in the clear, i.e. plaintext, as long as the user keys are not distributed.

Having disclosed some basic system components and concepts, the disclosure now turns to the exemplary method embodiment shown in FIGS. 5 and 6. For the sake of clarity, the methods are discussed in terms of an exemplary system 100 as shown in FIG. 1 configured to practice the respective method. The steps outlined herein are exemplary and can be implemented in any combination thereof, including combinations that exclude, add, or modify certain steps.

FIG. 5 illustrates an exemplary method embodiment for facilitating communications based on trusted relationships. The first communications device receives a communication request from a second communication device for a specific resource, wherein the communication request is based, at least in part, on trust information generated by a previously established trusted relationship (502). The trust information can include, for example, a trust user ID and a trust key. The trust information received in the communication request generally corresponds to local trust information existing at the first communications device. Thus, even though the trust information received from the second communications device may not be exactly the same as the trust information stored on the first communications device, the two separate sets of trust information correspond to each other in that they each allow communications between the two devices. The trust information can be generated according to any trust establishment approach. In one example, the trust information is generated from an exchange of a challenge query and a response based on a communication context between a first user and a second user, and wherein each of the first communication device and the second communication device has a copy of the trust information. The communication request is a session initiation protocol request, and wherein headers of the session initiation protocol request are unencrypted and payload of session initiation protocol request is encrypted.

Then the first communications device confirms, via an access to a trust database and using the trust information, (1) an identity of a sender of the communication request and (2) access permissions for a requested resource (504). The first communications device can perform a database look up based on the sender identity to determine whether any access permissions have been approved for that sender and, if so, which access permissions are approved.

If the identity and the access permissions are confirmed, the first communications device establishes communications between the first communications device and the second communications device in response to the communication request according to the specific resource (506). At least part of the communications between the first communications device and the second communications device can be encrypted according using the trust information, such as using transport layer security (TLS).

In one variation, the system can, upon receiving an acknowledgement of the communication request, establish secure communications between the first communication device and the second communication device based on the trust information. The secure communications can encrypt streamed voice communications based on at least one of a phone number, a session initiation protocol address, and a credential. The acknowledgement can be generated by the second communication device by looking up, based on an identity associated with the first communication device, the trust information in a database of identities and trust information.

FIG. 6 illustrates a second exemplary method embodiment for facilitating communications. The first communications device receives a communication request from a remote communication device for a specific resource, wherein the communication request is based, at least in part, on credential information generated based on a previously established trusted relationship (602). The specific resource can be a voice call, a video call, user presence information, and/or other requests, such as access to contact information or location data. The credential information can be generated from a trust establishment process, an example of which includes an exchange of a challenge query and a response based on a communication context with the remote communication device, and wherein each of the remote communication device and the memory stores a copy of the credential information. This exchange can occur as part of a previous separate communication.

The first communications device retrieves data, from a trust database associated with the previously established trusted relationship, based on the credential information (604). The trust database can store information representing trusted relationships between users established by successful exchanges of challenge queries and responses or other trust establishment techniques. Then, if the data corresponds to expected data for the remote communication device, the first communications device establishes communications with the remote communication device in response to the communication request according to the specific resource (606).

The approaches set forth herein provide a new way of generating or identifying trust information based on a previously established trusted relationship, and using trust information in a SIP invite to make sure that the identity of the other user is authentic, secure communications, and/or enable different forms of encrypted communication, information exchange, and so forth. If one communication device sends an encrypted message, and the other communication device can decrypt it, then the identity of one and/or the other is implicitly authenticated. This works so long as the trust information is kept secure, both sides' databases having compatible or corresponding trust information, and that trust information is not compromised.

This approach can operate using unmodified or modified SIP messages. Alternatively, this approach can operate on the server side by altering how SIP messages are processed. SIP payload can be encrypted, while leaving SIP non-payload portions unencrypted.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:

identifying a trusted relationship between a first user of a first organization and a second user of a second organization, wherein the trusted relationship is assigned one of a plurality of security levels depending on a level of user knowledge;

when the trusted relationship is identified, generating a cryptographic key;

receiving a request to establish a communication between the first user and the second user; and establishing, via a processor and in response to the request, an encrypted communication between the first user and the second user based on the cryptographic key.

2. The method of claim 1, wherein the cryptographic key is stored in a mapping table that maps the cryptography key with one of the first user and the second user.

3. The method of claim 1, wherein the encrypted communication is one of a voice communication, a video communication, and a streaming communication.

4. The method of claim 1, wherein the encrypted communication is based on a session initiation protocol.

5. The method of claim 1, wherein establishing the encrypted communication does not rely on a third-party certificate authority.

6. The method of claim 1, wherein the request is received from one of the first user and the second user.

7. The method of claim 1, wherein identifying the trusted relationship comprises identifying a prior association between the first user and the second user.

8. The method of claim 7, wherein identifying the prior association comprises searching for communication history common to the first user and the second user.

9. The method of claim 8, wherein the plurality of security levels is assigned according to one of a message subject, a message time, and a call time associated with the communication history.

10. The method of claim 7, wherein the trusted relationship is identified only when the prior association meets a threshold.

11. The method of claim 10, wherein the threshold comprises one of a number of associations and a duration of association.

12. The method of claim 1, wherein the request is received at the first organization, and wherein identifying the trusted relationship comprises issuing a challenge query from the first organization to the second organization.

13. The method of claim 12, wherein the challenge query is based on one of common communication history between the first user and the second user and information known to the second user.

14. The method of claim 12, wherein the challenge query is answered by the second user.

15. The method of claim 1, wherein the user knowledge is based on dynamic information.

16. The method of claim 1, wherein the cryptographic key is a first cryptographic key associated with the first user, the method further comprising:

generating a second cryptographic key associated with the second user, wherein the encrypted communication is established further based on the second cryptographic key.

17. The system comprising:

a processor; and a computer-readable storage medium storing instructions which, when executed by the processor, cause the processor to perform operations comprising:

identifying a trusted relationship between a first user of a first organization and a second user of a second organization, wherein the trusted relationship is assigned one of a plurality of security levels depending on a level of user knowledge;

when the trusted relationship is identified, generating a cryptographic key;

receiving a request to establish a communication between the first user and the second user; and in response to the request, establishing an encrypted communication between the first user and the second user based on the cryptographic key.

18. The system of claim 17, wherein identifying the trusted relationship comprises identifying a prior association between the first user and the second user.

19. The system of claim 17, wherein the request is received at the first organization, and wherein identifying the trusted relationship comprises issuing a challenge query from the first organization to the second organization.

20. The computer-readable storage device storing instructions which, when executed by a processor, cause the processor to perform operations comprising:

identifying a trusted relationship between a first user of a first organization and a second user of a second organization, wherein the trusted relationship is assigned one of a plurality of security levels depending on a level of user knowledge;

when the trusted relationship is identified, generating a cryptographic key;

receiving a request to establish a communication between the first user and the second user; and in response to the request, establishing an encrypted communication between the first user and the second user based on the cryptographic key.

* * * * *